(12) United States Patent
Alur et al.

(10) Patent No.: US 6,324,496 B1
(45) Date of Patent: Nov. 27, 2001

(54) MODEL CHECKING OF HIERARCHICAL STATE MACHINES

(75) Inventors: Rajeev Alur, Ardmore, PA (US); Mihalis Yannakakis, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/099,372

(22) Filed: Jun. 18, 1998

(51) Int. Cl.$^7$ .................................................. G06F 17/50
(52) U.S. Cl. ............................ 703/17; 703/22; 714/39; 716/4
(58) Field of Search ............................ 703/2, 22, 17; 395/500.05, 500.06; 714/39, 724; 710/130; 702/118; 707/101; 716/4

(56) References Cited

U.S. PATENT DOCUMENTS

| | | | |
|---|---|---|---|
| 4,930,072 | * 5/1990 | Agrawal et al. | 364/300 |
| 5,163,016 | * 11/1992 | Har'El et al. | 364/578 |
| 5,291,427 | * 3/1994 | Loyer et al. | 364/578 |
| 5,463,563 | * 10/1995 | Bair et al. | 364/490 |
| 5,513,122 | * 4/1996 | Cheng et al. | 364/489 |
| 5,606,698 | * 2/1997 | Powell | 395/709 |
| 5,680,332 | * 10/1997 | Raimi et al. | 364/578 |
| 5,752,241 | * 5/1998 | Cohen | 707/3 |
| 5,764,951 | * 6/1998 | Ly et al. | 395/500 |
| 5,937,195 | * 8/1999 | Ju et al. | 395/709 |
| 5,995,739 | * 11/1999 | Rotbart | 395/500.38 |
| 5,999,717 | * 12/1999 | Kaufmann et al. | 395/500.23 |
| 6,009,250 | * 12/1999 | Ho et al. | 395/500.06 |
| 6,175,946 | * 1/2001 | Ly et al. | 716/4 |

OTHER PUBLICATIONS

Edmund Clark, Jr. "Automatic Verification of Finite State Concurrent Systems," IEEE, 1994, pp. 126.*
Burch et al., "Symbolic Model Checking for Sequential Circuit Verification," IEEE, 1994, pp. 401–424.*
Zuan Zhang, "An Approach to Hierarchy Model Checking via Evaluating CTL Hierarchically," IEEE, 1995, pp. 45–49.*

(List continued on next page.)

Primary Examiner—Kevin J. Teska
Assistant Examiner—Thai Phan
(74) Attorney, Agent, or Firm—Steve Mendelsohn

(57) ABSTRACT

Model checking is applied to a hierarchical state machine (i.e., a state machine having at least one state (i.e., a superstate) that is itself a state machine) without first flattening the hierarchical state machine. In one embodiment, the model checking involves one or more or reachability, cycle-detection, linear-time requirements, and branching-time requirements analyses. For reachability analysis, in addition to keeping track of whether states have been visited, the algorithm also keeps track of the exit nodes for each superstate. Cycle-detection analysis has two phases: a primary phase in which target states are identified and a secondary phase in which it is determined whether identified target states are part of closed processing paths or loops. For cycle-detection analysis, the algorithm keeps track of (1) whether states have been visited during the primary phase, (2) the exit nodes for each superstate, and (3) whether states have been visited during the secondary phase. For linear-time requirements analysis, a formula is translated into an automaton, and a product construction is defined between the automaton and a hierarchical machine that yields a new hierarchical machine that is then analyzed using the cycle-detection algorithm. For branching-time requirements analysis, a list of subformulas is generated for an original temporal logic formula, where the subformulas are arranged in order of increasing size. An appropriate subroutine is then implemented for each subformula in the list based on the syntax of the subformula. For certain syntaxes, multiple versions are generated of the finite state machine corresponding to each superstate to represent different possible temporal logic conditions, and an appropriate version is selected for the context of each occurrence of the superstate in the hierarchical state machine. After processing the entire list of subformulas, it is determined whether the entry node of the hierarchical state machine satisfies the original temporal logic formula.

25 Claims, 10 Drawing Sheets

OTHER PUBLICATIONS

Gerth et al., "A Partial Order Approach to Branching Time Logic Checking," IEEE, 1995, pp. 130–139.*

Gitanjali Swamy, "Formal Verification of Digital Systems," IEEE, 1996, pp. 213–217.*

Brave, Heymann, "Control of Discrete Event Systems Molded as Hierarchiacal State Machines," IEEE, 1991, pp. 1499–1504.*

"Statecharts: A Visual Formalism for Complex Systems," by David Harel, Science of Computer Programming 8 (1987) (North–Holland), pp. 231–274.

* cited by examiner

FIG. 3

```
1   Input:      A hierarchical structure K and a target region T.
2   Output:     The answer to the reachabilty problem (K,T).
3   u:          Current state in K.
4   visited:    Set of nodes and boxes visited during algorithm.
5   N:          Set of normal or ordinary states in K.
6   done(i):    Set of exit nodes of the i^th FSM that are reachable from its entry node.
7   (u,v):      Edge connecting the current state u and state v.
8   E:          Set of edges in K.
9   Y:          FSM corresponding to a superstate.
10  in_i :      Entry point of the i^th FSM.
11  O_i :       Set of exit nodes of the i^th FSM.
12
13  function DFS(u)
14          if u ∈ T then return YES;
15          Insert(u,visited);
16          if u ∈ N then
17                  foreach (u,v) ∈ E do
18                          if v ∉ visited then DFS(v)
19          else
20                  i:=Y(u);
21                  if in_i ∉ visited then DFS(in_i);done(i):=visited∩O_i;
22                  foreach v ∈ done(i) do
23                          foreach ((u,v),w) ∈ E do
24                                  if w ∉ visited then DFS(w)
25  end DFS.
26
27  DFS(in_1)
28  return NO.
```

FIG. 5

```
1   Input:       A hierarchical structure K and a target region T.
2   Output:      The answer to the cycle-detection problem (K,T).
3   u:           Current state in K.
4   Stack:       Stack of nodes and boxes forming path from entry point in₁ to
                 current state u.
5   visitedₚ:    Set of nodes and boxes visited during a primary search.
6   visitedₛ:    Set of nodes and boxes visited during a secondary search.
7   N:           Set of normal or ordinary states in K.
8   (u,v):       Edge connecting the current state u and state v.
9   E:           Set of edges in K.
10  done(i):     Set of exit nodes of the iᵗʰ FSM that are reachable from its entry node.
11  Y:           FSM corresponding to a superstate.
12  inᵢ:         Entry point of the iᵗʰ FSM.
13  Oᵢ:          Set of exit nodes of the iᵗʰ FSM.
14
15       functionDFSₚ(u)
16              Push(u,Stack)
17              Insert(u,visitedₚ)
18              if u ∈ N then
19                     foreach (u,v) ∈ E do
20                            if v ∉ visitedₚ then DFSₚ(v);
21                     if u ∈ T and u ∉ visitedₛ then DFSₛ(u)
22              else
23                     i:=Y(u)
24                     if inᵢ ∉ visitedₚ then DFSₚ(inᵢ);done(i):=visitedₚ∩Oᵢ;
25                     foreach v ∈ done(i) do
26                            foreach ((u,v),w) ∈ E do
27                                   if w ∉ visitedₚ then DFSₚ(w);
28                            if v ∈ visitedₛ then
29                                   foreach ((u,v),w) ∈ E do
30                                          if w ∈ Stack then return YES;
31                                          if w ∉ visitedₛ then DFSₛ(w);
32              Pop(Stack);
33       endDFSₚ
34
35       function DFSₛ(u)
36              Insert(u,visitedₛ);
37              If u ∈ N then
38                     foreach (u,v) ∈ E do
39                            if v ∈ Stack then return YES;
40                            if v ∉ visitedₛ then DFSₛ(v)
41              else
42                     i:=Y(u)
43                     foreach v ∈ done(i) do
44                            foreach ((u,v),w) ∈ E do
45                                   if w ∈ Stack then return YES;
46                                   if w ∉ visitedₛ then DFSₛ(w)
47       endDFSₛ
48
49       DFSₚ(in₁)
50       returnNO.
```

FIG. 8

```
1    Input:        A hierarchical structure K and a CTL formula φ.
2    Output:       The answer to the model-checking problem (K,φ).
3    N:            Set of all ordinary states in K.
4    X(u):         Set of all subformulas that are true at state u.
5    in₁:          Entry point to K.
6
7    sub(φ):=list of subformulas of φ in increasing order of size.
8    foreach Ψ ∈ sub(φ) do
9         case Ψ:
10             Ψ ∈ P:       skip;
11             Ψ =¬X:     : foreach u ∈ N do if X ∉ X(u) then Insert(Ψ,X(u));
12             Ψ =Ψ₁∧Ψ₂:    foreach u ∈ N do if Ψ₁∈ X(u) and Ψ₂ ∈ X(u) then
                                                              Insert(Ψ,X(u));
13             Ψ =∃○X:      K:=CheckNext(K,X);
14             Ψ =∃□X:      K:=CheckAlways(K,X);
15             Ψ =Ψ₁∃UΨ₂:   K:=CheckUntil(K,Ψ₁,Ψ₂)
16
17   if φ ∈ X(in₁) then return YES else return NO.
```

MODEL CHECKING OF HIERARCHICAL STATE MACHINES

BACKGROUND OF THE INVENTION

1. Field of the Invention

The present invention relates to finite state machines, and, in particular, to model checking of hierarchical state machines.

2. Description of the Related Art

Finite state machines (FSMs) are widely used in the modeling of systems in various areas. Descriptions using FSMs are useful to represent the flow of control (as opposed to data manipulation) and are amenable to formal analysis such as model checking. In the simplest setting, an FSM consists of a labeled graph whose vertices correspond to system states and whose edges correspond to system transitions.

In practice, to describe complex systems using FSMs, extensions from this basic FSM definition are useful, including the following three orthogonal extensions: (1) communicating FSMs, in which annotations are added so that transitions within different FSMs corresponding to different components can be synchronized; (2) extended FSMs, in which variables, such as counters and buffers, together with guarded assignments on transitions, are added to allow succinct description; and (3) hierarchical or nested FSMs, in which vertices of an FSM can be ordinary states or superstates that are themselves FSMs. While the impact of adding the first two features to the complexity of analysis problems has been well understood, this has not been the case with regard to the impact of the third feature.

The ability to nest FSMs is common in many specification formalisms and methods. It is a central component of various object-oriented software development methodologies that have been developed in recent years. This capability is commonly available also in commercial computer-aided software engineering tools that are coming out.

The nesting capability is useful also in formalisms and tools for the requirements and testing phases of the software development cycle. On the requirements side, it is used to specify scenarios (or use cases) in a structured manner. For instance, the International Telecommunication Union (ITU) standard Z.120 for message sequence charts formalizes scenarios of distributed systems in terms of hierarchical graphs built from basic message sequence charts. On the testing side, FSMs are used often to model systems for the purpose of test generation, and again the nesting capability is useful to model large systems. This is useful for systems with informal and incomplete requirements and design documentation, as is often the case, and especially for software that was developed and evolved over a long period of time, when the test models are updated for continued regression testing as the system evolves.

An example of a hierarchical FSM is a digital clock. The top-level state machine for a digital clock may consist of a cycle through 24 superstates, with each superstate corresponding to a different hour of the day. Each such state, in turn, is a hierarchical state machine consisting of a cycle through 60 superstates counting minutes, each of which, in turn, is an (ordinary) state machine consisting of a cycle counting 60 seconds.

Hierarchical state machines have two descriptive advantages over ordinary FSMs. First, superstates offer a convenient structuring mechanism that allows a system to be specified in a stepwise refinement manner, where the system can be viewed at different levels of granularity. Such structuring is particularly useful for specifying large FSMs via a graphical interface. Second, by allowing sharing of component FSMs, components need to be specified only once and then reused in different contexts, leading to modularity and succinct system representations. For instance, the 24 superstates of the top-level FSM for the digital clock can be mapped to the same hierarchical FSM corresponding to an hour, and the 60 superstates corresponding to the minutes of each hour can be mapped to the same ordinary FSM corresponding to a second.

Model checking is emerging as a practical tool for detecting logical errors in early stages of system design. As such, model checking is particularly useful in automated debugging of complex reactive systems such as embedded controllers and network protocols. In model checking, a high-level description of a system is compared against a correctness requirement to discover inconsistencies.

The straightforward approach to applying model checking to a hierarchical state machine is to flatten it (i.e., recursively substitute each superstate with its associated FSM) and then apply a model checking tool to the resulting ordinary FSM. Such flattening, however, can cause a large blow-up in the size of the state machine, particularly when there is a lot of sharing of component FSMs. For instance, the hierarchical description of the digital clock has $24+60+60=144$ vertices, while the equivalent flattened FSM has $24*60*60=86,400$ vertices. Thus, if the hierarchical state machine is first flattened and then subjected to a conventional model checking algorithm, the worst-case complexity would be exponential in the original description of the structure. The amount of computer memory needed to represent such flattened FSMs can be prohibitively large.

SUMMARY OF THE INVENTION

According to the present invention, model checking is applied to hierarchical state machines without first flattening the state machine.

The model checking may include a reachability analysis in which reachability of one or more target states is determined while maintaining (1) a first set of information to keep track of states that have been visited during the reachability analysis, and (2) a second set of information to keep track of one or more exit nodes for each state in the hierarchical state machine that is a superstate corresponding to a finite state machine.

In addition or alternatively, the model checking may include a cycle-detection analysis in which reachability of one or more target states existing in a closed processing path is determined while maintaining (1) a first set of information to keep track of states that have been visited during a first phase of the cycle-detection analysis in which reachability of at least one of the one or more target states is determined, (2) a second set of information to keep track of one or more exit nodes for each state in the hierarchical state machine that is a superstate corresponding to a finite state machine, and (3) a third set of information to keep track of states that have been visited during a second phase of the cycle-detection analysis in which it is determined whether a reachable target state is part of a closed processing path.

In addition or alternatively, the model checking may include a linear-time requirements analysis in which a formula is translated into an automaton. A product construction is defined between the automaton and a hierarchical machine that yields a new hierarchical machine that is then analyzed using the cycle-detection algorithm.

In addition or alternatively, the model checking may include a branching-time requirements analysis in which states in the hierarchical state machine are identified that satisfy one or more temporal logic requirements, wherein, for each temporal logic requirement, multiple versions are generated of the FSM corresponding to each state in the hierarchical state machine that is a superstate to represent different possible temporal logic conditions of the FSM and an appropriate FSM version is selected for the context of each occurrence of the superstate in the hierarchical state machine.

BRIEF DESCRIPTION OF THE DRAWINGS

Other aspects, features, and advantages of the present invention will become more fully apparent from the following detailed description, the appended claims, and the accompanying drawings in which:

FIG. 3 shows pseudocode for the reachability algorithm, according to one embodiment of the present invention;

FIG. 5 shows pseudocode for the cycle-detection algorithm, according to one embodiment of the present invention;

FIG. 8 shows pseudocode for the branching-time requirements algorithm, according to one embodiment of the present invention.

DETAILED DESCRIPTION

According to the present invention, model checking is applied to a hierarchical state machine without first flattening the state machine. According to one embodiment of the present invention, the model checking may involve one or more of reachability analysis, cycle-detection analysis, linear-time requirements analysis, and branching-time requirements analysis. After a more general discussion of hierarchical state machines, each of these different types of model checking analysis is described in detail.

For purposes of this patent application, the terms "nodes," "states," and "points" are used interchangeably to refer to the vertices of finite state machines. Similarly, the terms "normal state" and "ordinary state" are used interchangeably, as are the terms "boxes" and "superstates." A vertex of an FSM may be a normal or ordinary state, or it may be a box or superstate that is itself an FSM. Each superstate has an "entry node" where processing of the corresponding FSM begins and one or more "exit nodes" where processing of the corresponding FSM can end.

Hierarchical State Machines

There are many variants of finite state machines. For purposes of this patent application, FSMs are described in terms of Kripke structures due to their prevalent use in model checking literature. Similar results hold for the other variants of FSMs, e.g., Mealy and Moore type FSMs where inputs and/or outputs occur on the states or transitions. Kripke structures are state-transition graphs whose states are labeled with atomic propositions. Formally, given a finite set P of atomic propositions, a (flat) Kripke structure M over P consists of (1) a finite set W of states, (2) an initial state $in \in W$, (3) a set R of transitions, where each transition is a pair of states, and (4) a labeling function L that labels each state with a subset of P.

A hierarchical Kripke structure K over a set of propositions P is an tuple $<K_1, \ldots, K_n>$ of structures, where each $K_i$ has the following components:

A finite set $N_i$ of nodes;

A finite set $B_i$ of boxes (or supernodes);

An initial node $in_i \in N_i$;

A subset $O_i$ of $N_1$, called exit nodes;

A labeling function $X_i: N_i \rightarrow 2^P$ that labels each node with a subset of P;

An indexing function $Y_i: B_i \rightarrow \{i+1, \ldots, n\}$ that maps each box to an index greater than i; and An set of edge relations $E_i$. Each edge in $E_i$ is a pair (u,v) such that (1) the source u is either a node of $K_i$, or a pair $(w_1, w_2)$, where $w_1$ is a box of $K_i$ with $Y_i(w_1)=j$ and $w_2$ is an exit node of $K_j$, and (2) the sink v is either a node or a box of $K_i$.

Figure 1:
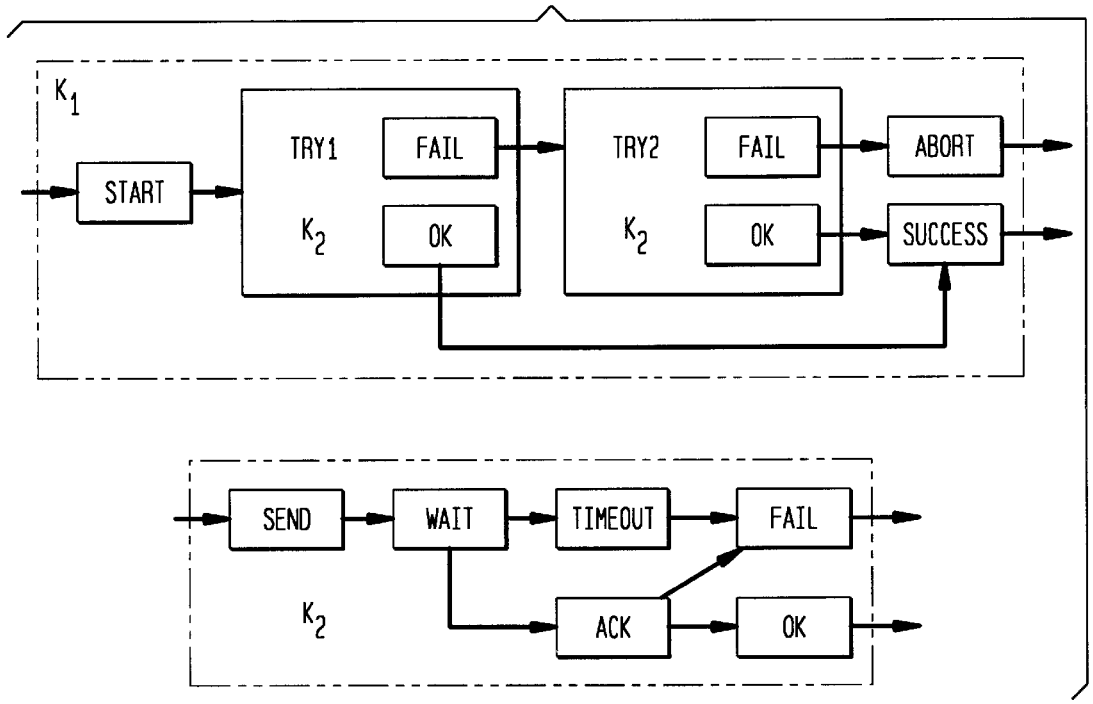
FIG. 1 shows an example of a hierarchical Kripke structure (state machine)

The edges connect nodes and boxes with one another. Since the structure associated with a box can have multiple exit nodes, an edge out of a box also specifies the exit node. An example of a hierarchical Kripke structure is shown in FIG. 1. The top-level structure $K_1$ has two boxes, try1 and try2, both of which are mapped to $K_2$. The structure $K_2$ represents an attempt to send a message. The attempt fails if a timeout occurs before the receipt of an acknowledgment, or if the acknowledgment is not consistent with the message sent. In the structure $K_1$, if the first attempt fails, a second attempt is tried.

Figure 2:
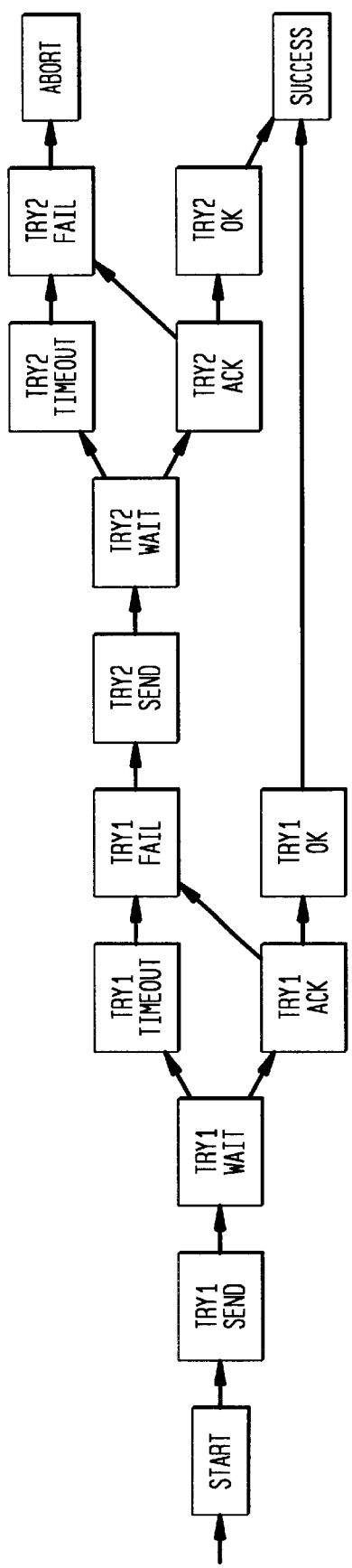
FIG. 2 shows the expanded or flattened structure corresponding to the hierarchical structure of FIG. 1.

An ordinary flat structure can be associated with each hierarchical structure by recursively substituting each box by the structure indexed by the box. Since different boxes can be associated with the same structure, each node can appear in different contexts. The expanded structure corresponding to the hierarchical structure of FIG. 1 is shown in FIG. 2. The expanded flat structure will be denoted $K_1^F$. Note that every node of $K_2$ appears twice in $K_1^F$. For instance, the node send appears as (try1, send) and (try2, send). In general, a state of the expanded structure is a vector whose last component is a node, and the remaining components are boxes that specify the context.

A formal definition of expansion of a hierarchical Kripke structure $K=<K_1, \ldots, K_n>$ is given as follows:

For each structure $K_i$, the set $W_i$ of states of $K_i^F$ is defined inductively: (1) every node of $K_i$ belongs to $W_i$, and (2) if u is a box of $K_i$ with $Y_i(u)=j$, and v is a state of $K_j^F$, then (u,v) belongs to $W_i$.

The set $R_i$ of transitions of $K_i^F$ is defined inductively: (1) for (u,v) $\in E_i$, if the sink v is a node, then (u,v) $\in R_i$, and if the sink v is a box with $Y_i(v)=j$, then $(u,(v,in_j)) \in R_i$, and (2) if w is a box of $K_i$ with $Y_i(w)=j$, and (u,v) is a transition of $K_j^F$, then ((w,u),(w,v)) belongs to $R_i$.

The labeling function $L_i: W_i \rightarrow 2^P$ of $K_i^F$ is defined inductively: if w is a node of $K_i$, then $L^i(w)=X_i(w)$, and if w=(u,v), where u is a box of $K_i$ with $Y_i(u)=j$, then $L_i(w)$ equals $L_j(v)$. Thus, the last component of every state is a node, and the propositional labeling of the last component determines the propositional labeling of the entire state.

The structure $<W_i, in_i, R_i, L_i>$ is a flat Kripke structure over P, and is called the expanded structure of $K_i$, denoted $K_i^F$. We denote $K_1^F$ also as $K^F$, the expanded structure of K.

The size of $K_i$, denoted $|K_i|$, is the sum of $|N_i|$, $|B_i|$, $|E_i|$, and $\Sigma_{b \in B_i}|E_{y_i(b)}|$. That is, for every box, the number of exit nodes of the structure is counted indexed by the box. The size of K is the sum of the sizes of $K_i$. The nesting depth of K, denoted nd(K), is the length of the longest chain $i_1, i_2, \ldots, i_j$ of indices, such that a box of $K_{i_l}$ is mapped to $i_{l+1}$. Observe that the size of the expanded structure $K^F$ can be exponential in the nesting depth, and is $O(|K|^{nd(K)})$.

Other variants of this definition are possible. First, multiple entry nodes can be allowed in the definition. Such a structure can be translated to the above definition by replacing a structure with k entry nodes with k structures, each with a single entry node. Multiple exit nodes are explicitly allowed, because the number of exit nodes has an important bearing on the complexity of the analysis problems to be studied (particularly, for branching time). Second, edges of the form (u,v) can be allowed, where u is a box, meaning that the edge may be taken whenever the control is inside the box u. That is, for an edge (u,v), the expanded structure has an edge from every state with first component u to v. Such a definition is useful in modeling interrupts, and can be translated to the above definition by introducing a dummy exit node.

Finally, the ordinary (i.e., un-nested) nodes of the hierarchical structure could themselves be other types of objects. For example, they could be basic message sequence charts, in which case the hierarchical structure specifies a hierarchical (or high-level) message sequence chart (MSC). In this case, there is concurrence within each basic MSC, but the hierarchical graph provides a global view of the system. The propositions on the nodes reflect properties for the basic objects (e.g., basic MSCs), and then, from these, properties of the executions of the whole hierarchical system can be inferred. For example, a property may be whenever process A requests a certain resource from B, it is eventually granted. In this case where there are two propositions (request and grant), each node (basic MSC) would be labeled with respect to them, and then the required property would be checked in the hierarchical graph.

Verifying Linear-Time Requirements

Reachability

For a hierarchical structure K, a state v is reachable from state u, if there is a path from state u to state v in the expanded structure $K^F$. The input to the reachability problem consists of a hierarchical structure K, and a subset $T \subseteq \cup_i N_i$ of nodes, called the target region. Given (K, T), the reachability problem is to determine whether or not some state whose last component is in the target region T is reachable from the entry node $in_1$. The target region is usually specified implicitly, for instance, by a propositional formula over P. Given a node u, it is assumed that the test $u \in T$ can be performed in O(1) time. The reachability problem can be used to check whether a hierarchical structure satisfies an invariant.

FIG. 3 shows pseudocode for the reachability algorithm, according to one embodiment of the present invention. Implementation of the reachability analysis for a hierarchical structure K begins with the calling of the depth-first search function DFS at the entry point $in_1$ of K (see line 27 of FIG. 3). The function DFS is a recursive function that is defined in lines 13–25 of FIG. 3. If the depth-first search implemented by DFS succeeds in reaching a node that is in a specified target region T, then the DFS function returns a positive result ("YES"). Otherwise, a negative result ("NO") is returned (see line 28).

Figure 4:
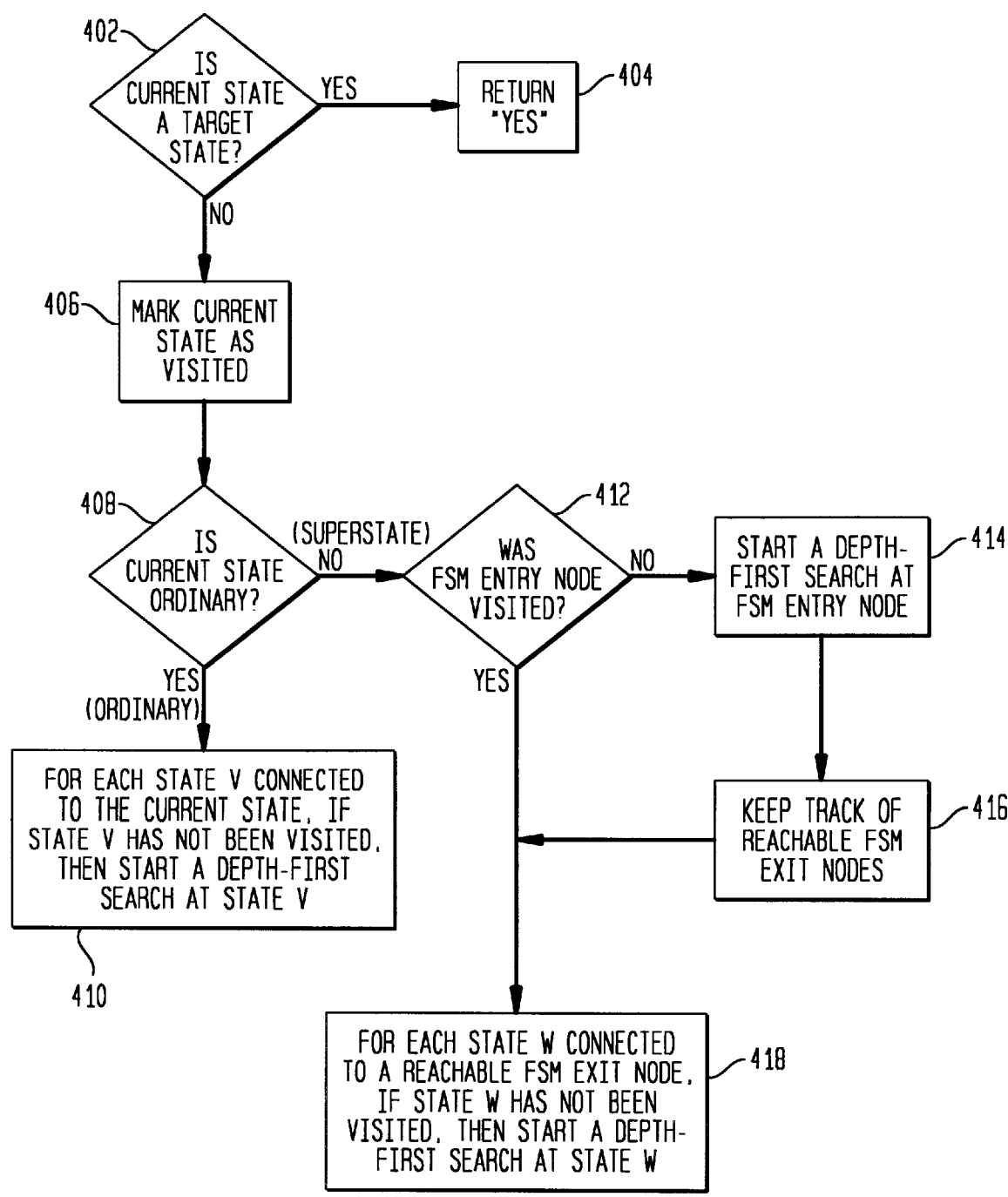
FIG. 4 shows a flow diagram of the processing of the depth-first search function DFS of FIG. 3.

FIG. 4 shows a flow diagram of the processing of the depth-first search function DFS of FIG. 3 when implemented at a current state u. If the current state u is in the target region T (step 402 of FIG. 4), then the function DFS returns the value "YES" (step 404) (line 14 of FIG. 3). The global data structure visited is then updated to indicate that the current state u has been visited during implementation of the reachability analysis (step 406 and line 15).

The function DFS treats ordinary states differently from superstates. If the current state u is an ordinary state (step 408 and line 16), then processing flows to step 410 and lines 17–18. In that case, for each state v connected directly to the current state u (line 17), if state v has not yet been visited during the reachability analysis, then a depth-first search is initiated at state v (line 18).

Otherwise, the current state u is a superstate and processing flows to steps 412–418 and lines 20–24. At line 20, the FSM Y corresponding to the superstate u is defined as the $i^{th}$ FSM. If the entry node in of the $i^{th}$ FSM has not yet been visited (step 412), then a depth-first search is initiated at the entry node $in_i$ (step 414) and the global data structure done(i) keeps track of the exit nodes of the $i^{th}$ FSM that have been visited as reachable exit nodes (step 416) (line 21). For each state w that is connected directly to a reachable exit node v of the superstate u (lines 22–23), if state w has not yet been visited during the reachability analysis, then a depth-first search is initiated at state w (step 418 and line 24).

For the reachability algorithm of FIGS. 3 and 4, it is assumed that the sets of nodes and boxes of all the structures are disjoint. N denotes $\cup_i N_i$, E denotes $\cup_i E_i$, etc. The algorithm performs a depth-first search, using the global data structure visited to store the nodes and boxes. While processing a box b with Y(b)=i, the algorithm checks if the entry node $in_i$, was visited before. The first time the algorithm visits some box b with index i, it searches the structure $K_i$ by invoking DFS($in_i$). At the end of this search, the set of exit nodes of $K_i$ that are reachable from $in_i$ is stored in the data structure done. If the algorithm visits subsequently some other box c with index i, it does not search $K_i$ again, but simply uses the information stored in done(i) to continue the search. It is easy to verify that the reachability algorithm of FIGS. 3 and 4 invokes DFS(u) at most once, for every $u \in N \cup B$. The cost of processing a node u equals the number of edges with source u. The cost of processing a box b with index i equals the number of exit nodes in done(i) and the number of edges with source b. Consequently, the running time of the algorithm is linear in the size of the input structure.

The reachability algorithm of FIGS. 3 and 4 correctly solves the reachability problem (K,T) with time complexity O(|K|). For flat Kripke structures, deciding reachability between two states is in Nlogspace. For hierarchical structures, however, the reachability problem becomes Ptime-hard, even if a single exit is required for every structure. The reachability problem (K,T) is Ptime-complete.

Cycle Detection

The basic problem encountered during verification of liveness requirements is to check whether a specified state can be reached repeatedly. As in the reachability problem, the input to the cycle-detection problem consists of a hierarchical Kripke structure K and a target region $T \subseteq N$. Given (K,T), the cycle-detection problem is to determine whether there exists a state u whose last component is in the target region T such that (1) u is reachable from the entry-node $in_1$, and (2) u is reachable from itself.

FIG. 5 shows pseudocode for the cycle-detection algorithm, according to one embodiment of the present invention. The algorithm involves two searches: a primary search and a secondary search. The primary search determines whether any states in the target region T can be reached, while the secondary search determines whether any such state is reachable from itself. The algorithm uses a global data structure visited$_P$ to store the states encountered during the primary search, and a global data structure visited$_S$ to store the states encountered during the secondary search. The primary search is performed by the function DFS$_P$. When the search backtracks from a node in the target region, or from a box whose exit node is in the target region, it initiates a secondary search. The secondary search is performed by the function DFS$_S$, which searches for a cycle (i.e., a closed processing path). A stack stores a path leading to the node or the box from which the secondary search was initiated. As such, the secondary search terminates by returning the value "YES" when it encounters a node or a box on the stack.

Implementation of the cycle-detection analysis for a hierarchical structure K begins with the calling of the primary search function DFS$_P$ at the entry point in$_1$ of K (see line 49 of FIG. 5). The primary search function DFS$_P$ is a recursive function that is defined in lines 15–33 of FIG. 5. If the primary search implemented by DFS$_P$ succeeds in reaching a node u that is in a specified target region T, then the secondary search function DFS$_S$ is called at node u. The secondary search function DFS$_S$ is a recursive function that is defined in lines 35–47 of FIG. 5. If the secondary search implemented by DFS$_S$ succeeds in reaching a node that is on the stack, then the DFS$_S$ function returns a positive result ("YES"). Otherwise, a negative result ("NO") is returned (see line 50).

Figure 6:
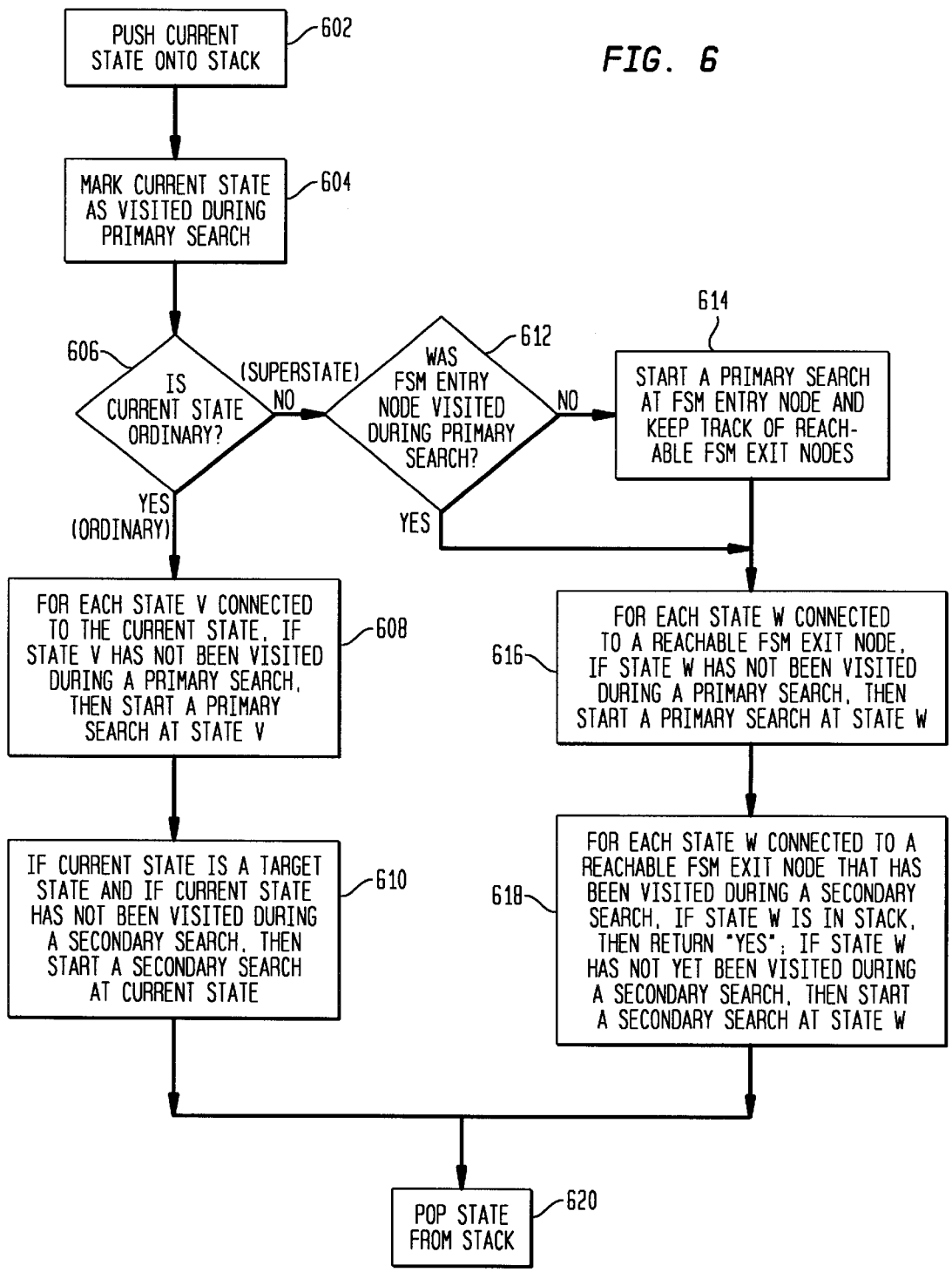
FIGS. 6 and 7 show flow diagrams of the processing of the primary and secondary functions $DFS_P$ and $DFS_S$ of FIG. 5, respectively.
Figure 7:
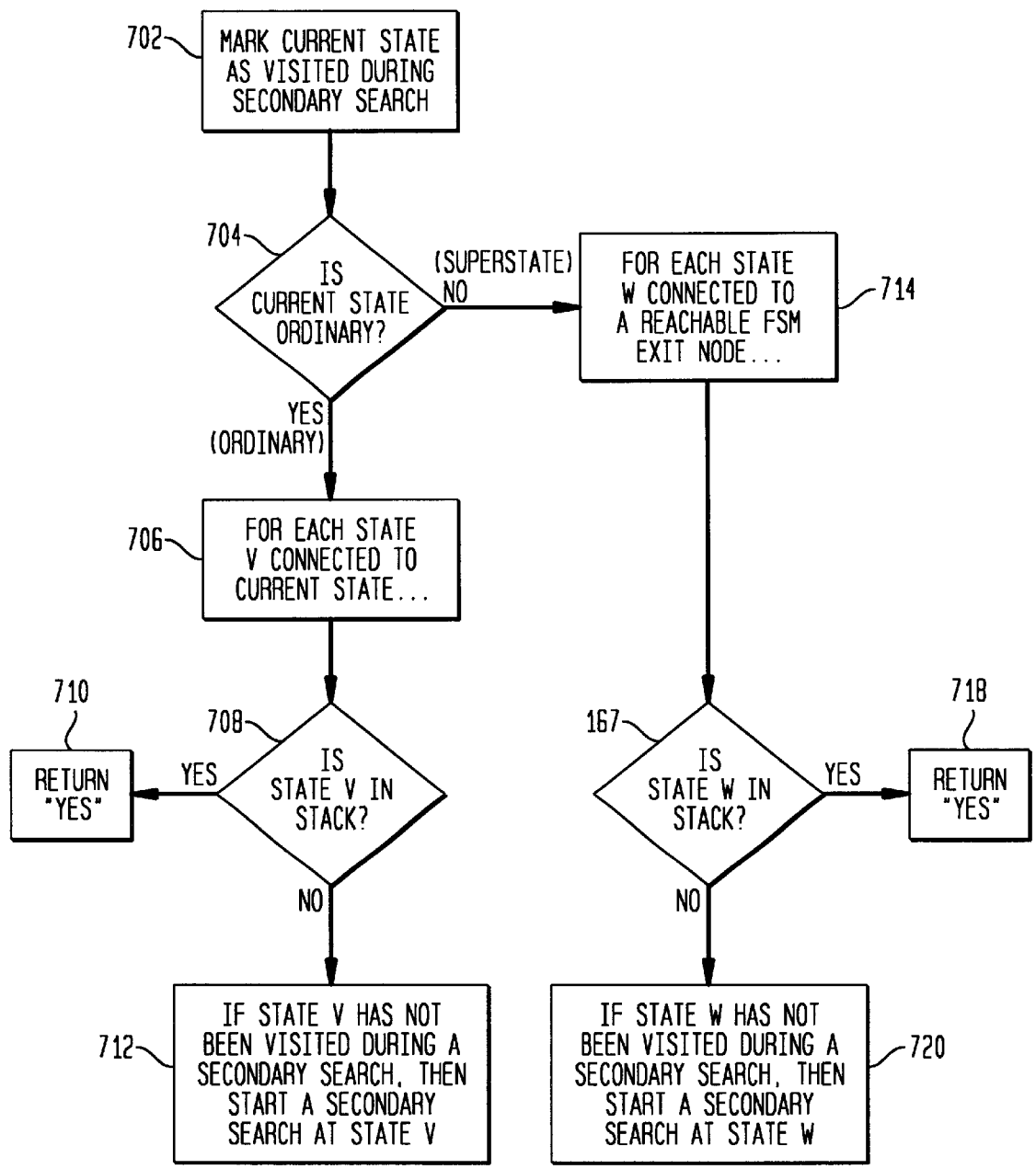

FIGS. 6 and 7 show flow diagrams of the processing of the primary and secondary functions DFS$_P$ and DFS$_S$ of FIG. 5, respectively, when implemented at a current state u.

The primary search function DFS$_P$ begins with the current state u being pushed onto the stack (step 602 of FIG. 6 and line 16 of FIG. 5). The global data structure visited$_P$ is then updated to indicate that the current state u has been visited during a primary search (step 604 and line 17).

The primary search function DFS$_P$ treats ordinary states differently from superstates. If the current state u is an ordinary state (step 606 and line 18), then processing flows to steps 608–610 and lines 19–21. In that case, for each state v connected directly to the current state u (line 19), if state v has not yet been visited during a primary search, then a primary search is initiated at state v (line 20 and step 608). If the current state u is in the target region T and if the current state u has not yet been visited during a secondary search, then a secondary search is initiated at the current state u (line 21 and step 610).

Otherwise, the current state u is a superstate and processing flows to steps 612–618 and lines 23–31. At line 23, the FSM Y corresponding to the superstate u is defined as the i$^{th}$ FSM. If the entry node in of the i$^{th}$ FSM has not yet been visited during a primary search (step 612), then a primary search is initiated at the entry node in$_i$ and the global data structure done(i) keeps track of the exit nodes of the i$^{th}$ FSM that have been visited as reachable exit nodes (step 614) (line 24). For each state w that is connected directly to a reachable exit node v of the superstate u (lines 25–26), if state w has not yet been visited during a primary search, then a primary search is initiated at state w (step 616 and line 27). For each state w that is connected directly to a reachable exit node v of the superstate u, where the exit node v has already been visited during a secondary search (lines 25 and 28–29), if state w is on the stack, then the primary search function DFS$_P$ returns the value "YES" (line 30); otherwise, if state w has not yet been visited during a secondary search, then a secondary search is initiated at state w (line 31 and step 618).

Whether the current state u is an ordinary state or a superstate, the primary search ends by popping the current state off the stack (line 32 and step 620).

The secondary search function DFS$_S$ begins with the global data structure visited$_S$ being updated to indicate that the current state u has been visited during a secondary search (step 702 of FIG. 7 and line 36 of FIG. 5).

The secondary search function DFS$_S$ treats ordinary states differently from superstates. If the current state u is an ordinary state (step 704 and line 37), then processing flows to steps 706–712 and lines 38–40. In that case, for each state v connected directly to the current state u (step 706 and line 38), if state v is on the stack (step 708), then the secondary search function DFS$_S$ returns the value "YES" (step 710 and line 39); otherwise, if state v has not yet been visited during a secondary search, then a secondary search is initiated at state v (line 40 and step 712).

Otherwise, the current state u is a superstate and processing flows to steps 714–720 and lines 42–46. At line 42, the FSM Y corresponding to the superstate u is defined as the i$^{th}$ FSM. Since, by this point in the processing, the FSM corresponding to superstate u will have already been analyzed during a primary search to identify its exit nodes (see line 24 of FIG. 5 and steps 612–614 of FIG. 6), the information in the global data structure done(i) can be re-used by the secondary search function DFS$_S$. In particular, for each state w that is connected directly to an exit node v of the superstate u (lines 43–44 and step 714), if state w is on the stack (step 716), then the secondary search function DFS$_P$ returns the value "YES" (step 718 and line 45); otherwise, if state w has not yet been visited during a secondary search, then a secondary search is initiated at state w (line 46 and step 720).

For complexity analysis, observe that for every u∈N∪B, the primary search function DFS$_P$(u) is invoked at most once for each state, and the secondary search function DFS$_S$(u) is invoked at most once for each state. This gives linear time complexity. Like the reachability problem, the cycle-detection problem is also Ptime-complete. The cycle-detection problem (K,T) can be solved by a nested depth-first search with time complexity O(|K|).

Automata Emptiness

Let M=<W,in,R,L> be a Kripke structure over proposition set P. For a state w∈W, a source-w trajectory of M is an infinite sequence $w_0 w_1 w_2 \ldots$ of states in W such that $w_0 = w$ and $w_i R w_{i+1}$, for all $i \geq 0$. An initialized trajectory is a source-in trajectory. The trace corresponding to the trajectory $w_0 w_1 w_2 \ldots$ is the infinite sequence $L(w_0) L(w_1) \ldots$ over $2^P$ obtained by replacing each state with its label. The language $\mathcal{L}(M)$ consists of all the initialized traces of M.

A Büchi automaton A over P consists of a Kripke structure M over P and a set T of accepting states. An accepting trajectory of A is an initialized trajectory $w_0 w_1 w_2 \ldots$ of M such that $w_i \in T$ for infinitely many i. The language $\mathcal{L}(A)$ consists of all traces corresponding to accepting trajectories of A.

The input to the automata-emptiness problem consists of a hierarchical structure K over P and an automaton A over P. Given (K,A), the automata-emptiness problem is to determine whether the intersection $\mathcal{L}(A) \cap \mathcal{L}(K^F)$ is empty. According to the automata-theoretic approach to verification, if the automaton A accepts undesirable or bad behaviors, checking emptiness of $\mathcal{L}(A) \cap \mathcal{L}(K^F)$ corresponds to ensuring that the model has no bad behaviors.

According to the present invention, the automata-emptiness problem (K,A) is solved by reduction to a cycle-detection problem for the hierarchical structure obtained by constructing the product of K with A as follows. Let K=<$K_1, \ldots K_n$> where each $K_i$ =<$N_i,B_i,in_i,O_i,X_i,Y_i,E_i$>, and let A=<W={$w_1, \ldots w_m$},$w_i$,R,L,T>. The product structure K×A is the hierarchical structure <$K_{1l}, \ldots K_{1m}, \ldots K_{n1}, \ldots K_{nm}, \ldots$ > with mn structures. Each structure $K_i$ is repeated m times, one for every possible way of pairing its entry node with a state of A. Each structure $K_{ij}$ has the following components:

A node of $K_{ij}$ is a pair (u,w), where u∈$N_i$, w∈W, and X(u)=L(w); the label of (u,w) equals X(u).

A box of $K_{ij}$ is a pair (b,w), where b∈$B_i$ and w∈W; the index of (b,w) is m(i'-1)+j' if Y(b)=i' and w=$w_j$.

The entry node of $K_{ij}$ is (in$_i$,$w_j$), and a node (u,w) is an exit node of $K_{ij}$ if u∈$O_i$.

Consider a transition (w,x) of A. While pairing it with the edges in $E_i$, there are four cases to consider depending on whether the edge connects (i) a node to a node, (ii) a node to a box, (iii) a box to a node, or (iv) a box to a box.

Case (i): For an edge (u,v) of $K_i$ with u,v∈$N_i$, X(u)=L(w), and X(v)=L(x), there is an edge ((u,w),(v,x)) in $K_{ij}$.

Case (ii): For an edge (u,b) of $K_i$, with u∈$N_i$, b∈$B_i$, X(u)=L(w), and X(in$_{Y(b)}$)=L(x), there is an edge ((u,w),(b, x)) in $K_{ij}$.

Case (iii): For an edge ((b,u),v) of $K_i$ with b∈F $B_i$, u∈$O_{Y(b)}$, v∈$N_i$, X(u)=L(w), and X(v)=L(x), for every y∈W, there is an edge (((b,y),(u,w)),(v,x)) in $K_{ij}$.

Case (iv): For an edge ((b,u),c) of $K_i$ with b,c∈$B_i$, u∈$O_{Y(b)}$, X(u)=L(w), and X(in$_{Y(c)}$=L(x), for every y∈W, there is an edge (((b,y),(u,w)),(c,x)) in $K_{ij}$.

Note that if the propositional labeling of in$_i$ and $w_j$ is different, then the entry node of $K_{ij}$ is not defined.

The intersection $\mathcal{L}(A) \cap \mathcal{L}(K^F)$ is nonempty if and only if the answer to the cycle-detection question (K×A, N×T) is "YES." In other words, some trace of $K^F$ is accepted by A if and only if there is reachable cycle in K×A containing a node of the form (u,w) with w∈T. Hence, the automata-emptiness question can be solved using the cycle-detection algorithm of FIGS. 5–7. In the construction of K×A, the number of structures gets multiplied by the number of states of A, and the size of each structure gets multiplied by the size of A. It is not necessary to construct all of these structures ahead of time. Rather, they can be generated as they are needed (if at all) during the cycle-detection algorithm. In other words, if a box that represents one of these structures is reached during the algorithm, it can be computed at that time. The automata-emptiness question (K,A) can be solved by reduction to the cycle-detection problem in time $O(|A|^2 \cdot |K|)$.

Linear Temporal Logic

Requirements of trace sets can be specified using the temporal logic LTL. A formula φ of LTL over propositions P is interpreted over an infinite sequence over $2^P$. A hierarchical structure K satisfies a formula φ, written K⊨φ, iff (i.e., if and only if) every trace in $\mathcal{L}(K^F)$ satisfies the formula φ. The input to the LTL model checking problem consists of a hierarchical structure K and a formula φ of LTL. The model-checking problem (K,φ) is to determine whether or not K satisfies φ.

To solve the model-checking problem, a Büchi automaton $A_{\neg\phi}$ is constructed such that the language $\mathcal{L}(A_{\neg\phi})$ consists of precisely those traces that do not satisfy φ. This can be done using one of the known translations from LTL to Büchi automata. The size of $A_{\neg\phi}$ is $O(2^{|\phi|})$. Then, the hierarchical structure K satisfies φ iff $\mathcal{L}(K^F) \cap \mathcal{L}(A_{\neg\phi})$ is empty. Thus, the model-checking problem reduces to the automata-emptiness problem. The complexity of solving the automata-emptiness problem, together with the cost of translating an LTL formula to a Büchi automaton, implies that the LTL model-checking problem (K,φ) can be solved in time $O(|K| \cdot 4^{|\phi|})$.

An alternative approach to solve the LTL model-checking problem (K,φ) is to search for an accepting cycle in the product of the expanded structure $K^F$ with the automaton $A_{\neg\phi}$. This product has $|K|^{nd(K)} \cdot 2^{|\phi|}$ states, and the search can be performed in space $O(|K| \cdot |\phi|)$. This gives a Pspace upper bound on LTL model-checking problem. It is known that LTL model-checking problem for ordinary Kripke structures is Pspace-hard. This leads to the conclusion that the LTL model-checking problem (K,φ) is Pspace-complete.

Linear-Time Requirements

For linear-time requirements, the formula is translated into an automaton. A product construction is defined between the automaton and a hierarchical machine that yields a new hierarchical machine that is then analyzed using the cycle-detection algorithm.

Verifying Branching-Time Requirements

This section relates to verifying requirements specified in the branching-time temporal logic CTL. Given a set P of propositions, the set of CTL formulas is defined inductively by the grammar $$\varphi := p \mid \neg \varphi \mid \varphi \wedge \varphi \mid \exists \bigcirc \varphi \mid \exists \Box \varphi \mid \varphi \exists u \varphi$$

where φ is a CTL logic formula, p∈P, "¬" means "not", "∧" means "and", "∃○φ" means "along some path, there exists a next state for which φ is true", "∃□φ" means "along some path, φ is always true", and "$\phi_1 \exists u \phi_2$" means "along some path, $\phi_1$ is true, until $\phi_2$ is true". For a Kripke structure M=(W,in,R,L) and a state w∈W, the satisfaction relation $w \vDash_M \phi$ is defined below:

$w \vDash p$   iff $p \in L(w)$;

$w \vDash \neg \varphi$   iff $w \neg \vDash \varphi$;

$w \vDash \varphi \wedge \psi$   iff $w \vDash \varphi$ and $w \vDash \psi$;

$w \vDash \exists \bigcirc \varphi$   iff there exists a state $u$ with $wRu$ and $u \vDash \varphi$;

$w \vDash \exists \Box \varphi$   iff there exists a source-$w$ trajectory $w_0 w_1 \ldots$ such that $w_i \vDash \varphi$ for all $i \geq 0$;

$w \vDash \varphi \exists u \psi$   iff there exists a source-$w$ trajectory $w_0 w_1 \ldots$ such that $w_k \vDash \psi$ for some $k \geq 0$, and $w_i \vDash \varphi$ for all $0 \leq i < k$.

The Kripke structure M satisfies the formula φ, written M⊨φ, iff in⊨$_m$φ. A hierarchical Kripke structure K satisfies the CTL formula φ iff $K^F \vDash \phi$. The CTL model-checking problem is to determine, given a hierarchical Kripke structure K and a CTL formula φ, whether K satisfies φ.

Single-Exit Case

This section is directed to the case when every structure has a single exit node. In this case, the edges from boxes need not specify the exit node of the structure associated with the box, and each $E_i$ may be assumed to be a binary relation over $N_i \cup B_i$. The unique exit node of $K_i$ is denoted by out$_i$.

Figure 9:
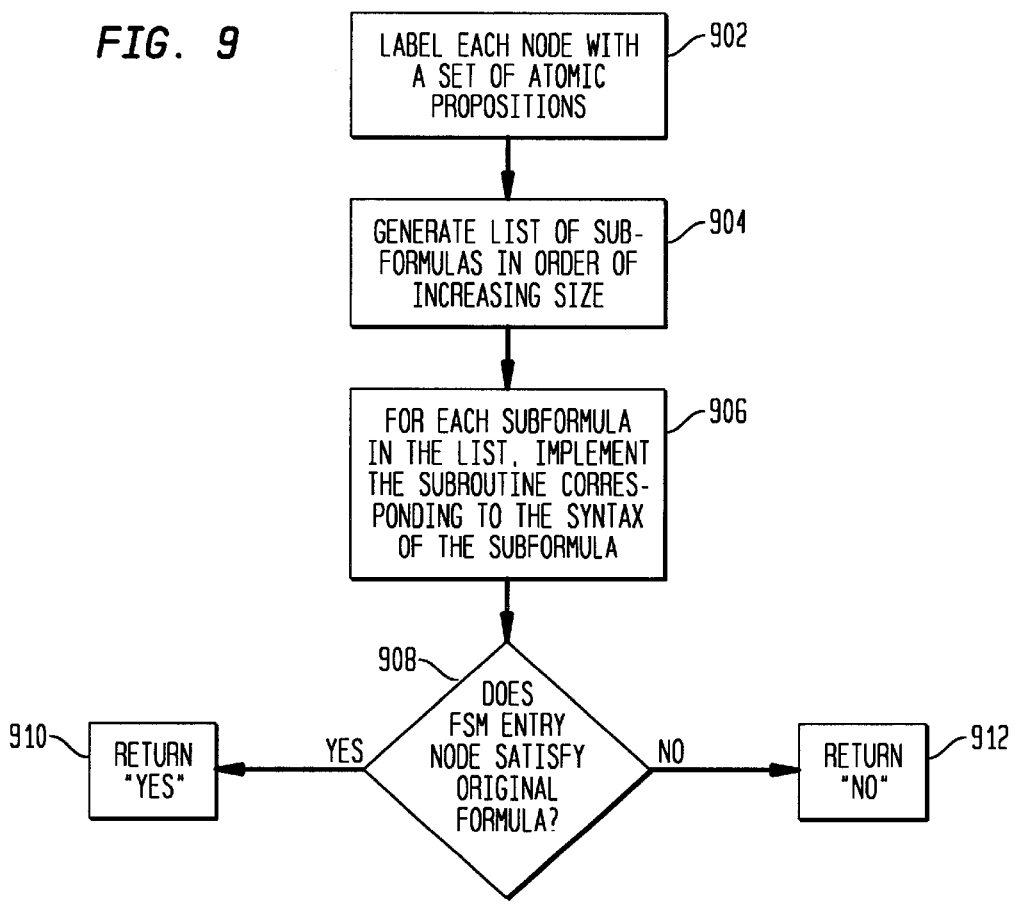
FIGS. 9–11 show flow diagrams of the processing of the branching-time requirements algorithm of FIG. 8.

FIG. 8 shows pseudocode for the branching-time requirements algorithm for a hierarchical structure K and a CTL formula ϕ, according to one embodiment of the present invention. FIG. 9 shows a flow diagram of the processing of the branching-time requirements algorithm of FIG. 8. At the beginning, the function Xlabels each node with a set P of atomic propositions (step 902 of FIG. 9). The algorithm considers subformulas of ϕ starting with the innermost subformulas, and labels each node with the subformulas that are satisfied at that node. At the end, if the entry-node of the first structure is labeled with ϕ, then the original structure satisfies ϕ.

In particular, a list sub of subformulas of ϕ are generated and arranged in order of increasing size (step 904 of FIG. 9 and line 7 of FIG. 8). For example, if ϕ=¬∃○p, then the list sub(ϕ)=(p,∃○p, ¬∃○p). For each subformula ψ in the list sub(ϕ), a set of operations is implemented as selected based on the syntax of the subformula ψ (step 906 and lines 8–15). After all of the subformulas in the list sub(ϕ), including the original formula ϕ have been processed, if the original formula ϕ is satisfied at the entry node in to structure K (step 908), then the algorithm returns the value "YES" (step 910); otherwise, the algorithm returns the value "NO" (step 912) (line 17).

As shown in line 10 of FIG. 8, if the syntax of the subformula ψ is atomic, then no further processing is required, because the initial labeling of nodes (i.e., step 902 of FIG. 9) will have already determined which atomic propositions apply to each of the nodes of the structure.

Figure 10:
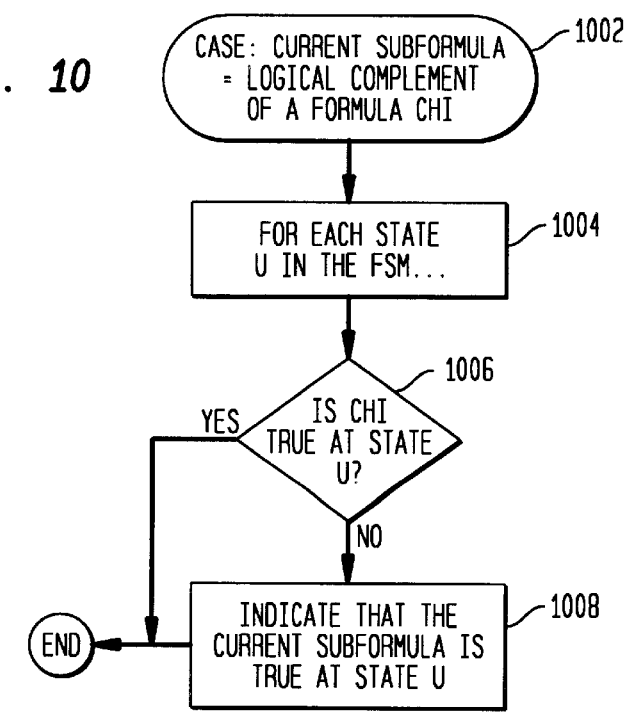

FIG. 10 shows a flow diagram of the processing of line 11 of FIG. 8, implemented when the syntax of the subformula ψ is the logical negation or complement ¬ of another subformula, called χ. In that case (step 1002 of FIG. 10), for each ordinary state u in the structure (step 1004), if the subformula χ is not true at state u (as indicated by whether χ is in the set X(u) of formulas that are true at state u) (step 1006), then indicate that the subformula ψ is true at state u by adding ψ to the set X(u) (step 1008).

Figure 11:
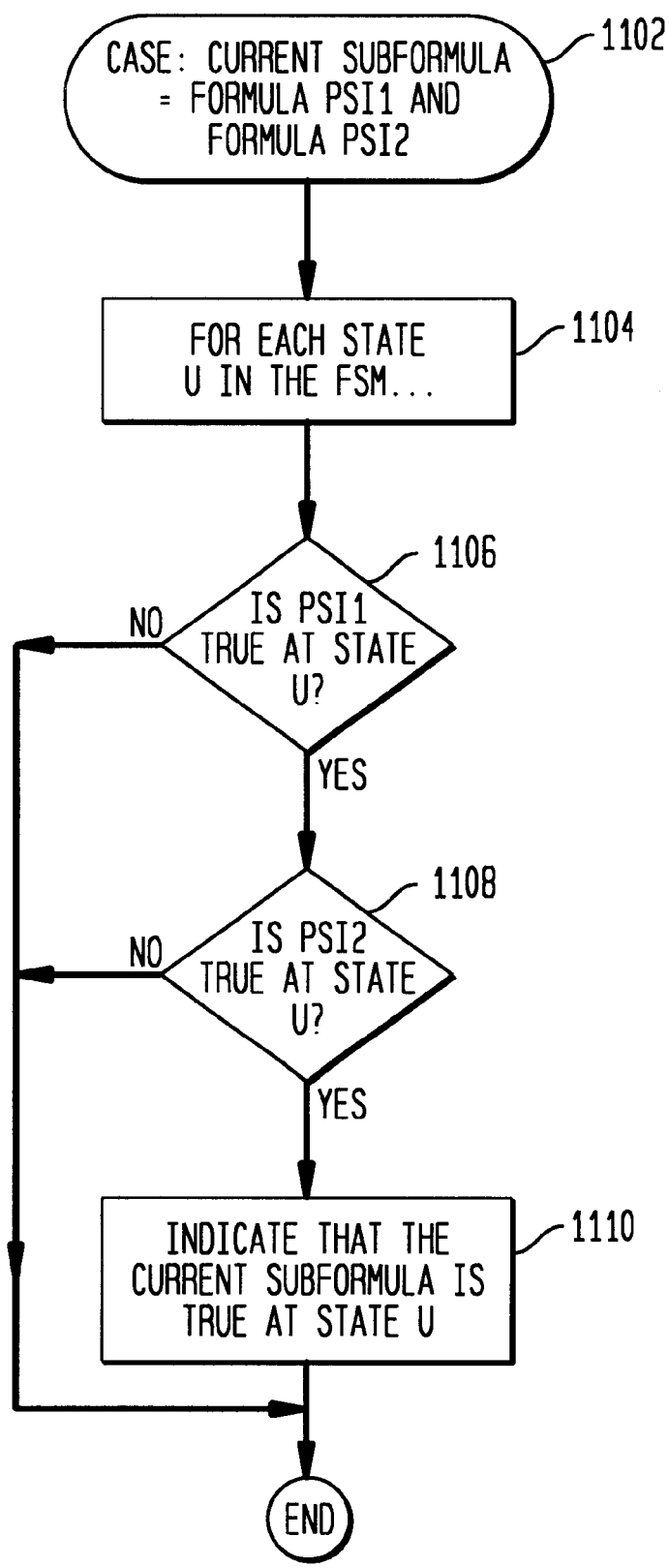

FIG. 11 shows a flow diagram of the processing of line 12 of FIG. 8, implemented when the syntax of the subformula ψ is the logical "AND" (∧) combination of two subformulas, called $\psi_1$ and $\psi_2$. In that case (step 1102 of FIG. 11), for each ordinary state u in the structure (step 1104), if the subformula $\psi_1$ is true at state u (step 1106) and if the subformula $\psi_2$ is true at state u (step 1108), then indicate that the subformula ψ is true at state u by adding ψ to the set X(u) (step 1110).

Processing of ∃○

Consider a hierarchical structure K. Consider a formula ψ=∃○p for a proposition p. The goal is to compute the set of nodes at which ψ is satisfied. Consider a node u of $K_2$. Multiple boxes of $K_1$ may be mapped to $K_2$, and hence, u may appear in multiple contexts in the expanded structure (i.e., there may be multiple states whose last component is u). If u is not the exit node, then the successors of u do not depend on the context. Hence, the truth of ψ id identical in all states corresponding to u, and can be determined from the successors of u within $K_2$; ψ holds in u if some successor node of u is labeled with p or if the entry node of the structure associated with some successor box of u is labeled with p. If u is the exit node of $K_2$, then the truth of ψ may depend on the context. For instance, the truth ∃○abort at the exit node fail of the structure $K_2$ of FIG. 1 is different in the two instances: the formula is false in (try1,fail) and is true in (try2,fail). In this case, two copies of $K_2$ are created: $K_2^0$ and $K_2^1$. The superscript indicates whether or not the exit-node of $K_2$ has some successor that satisfies p and is outside $K_2$. A box of $K_1$ which has a successor satisfying p is mapped to $K_2^1$ and to $K_2^0$ otherwise. The exit node of $K_2^1$ is labeled with ψ. The exit node of $K_2^0$ is labeled with ψ only if it has a successor within $K_2$ that satisfies p.

The processing of the CheckNext function of line 13 of FIG. 8 is now defined more formally. The input to Check-Next is a hierarchical structure K and a formula χ. Let K=<$K_1$, . . . $K_n$>, where each $K_i$=<$N_i$, $B_i$, $in_i$, $out_i$, $X_i$, $Y_i$, $E_i$>. The CheckNext function returns a hierarchical structure K'=<$K_1^0$, $K_1^1$, . . . $K_n^0$, $K_n^1$> by replacing each $K_i$ with two structures: $K_i^0$=<$N_i$, $B_i$, $in_i$, $out_i$, $X_i^0$, $Y_i'$, $E_i$> and $K_i^{1=<N}{}_i$, $B_i$, $in_i$, $out_i$, $X_i^1$, $Y_i'$, $E_i$>. A state u∈$N_i$∪$B_i$ has a χ-successor, if either (i) there exists a node v of $K_i$ with (u,v) ∈$E_i$ and χ∈$X_i$(v), or (ii) there exists a box b of $K_i$ with (u,b) ∈$E_i$ and χ∈$X_k$($in_k$) for k=$Y_i$(b).

For a box b of $K_i$ with $Y_i$(b)=j, if b has a χ-successor, then $Y_i'$(b)=2j; otherwise, $Y_i'$(b)=2j−1.

For a node u of $K_i^0$, if node u has a χ-successor, then ∃○χ∈$X_i^0$(u); otherwise, ∃○χ∉$X_i^0$(u).

For a node u of $K_i^1$, if node u has a χ-successor or if u is the exit node of $K_i$, then ∃○χ∈$X_i^1$(u); otherwise, ∃○χ∉$X_i^1$(u).

Observe that if the exit node $out_i$ has a χ-successor, then $K_i^0$ and $K_i^1$ are identical, and, in this case, one of them can be deleted. That is, there is no need to create two instances.

Processing of ∃□

Conceptually, the processing of the CTL logic formula "∃□ϕ" which means "along some path, ϕ is always true," is very similar to the processing described in the previous section for the CTL logic formula "∃○ϕ," which means "along some path, there exists a next state for which ϕ is true." Those skilled in the art will understand how to modify the processing for the one CTL logic formula to implement processing for the other CTL logic formula.

Processing of ∃u

Whether a node u of a structure $K_i$ satisfies the until-formula $\psi_1$∃u$\psi_2$ may depend on what happens after exiting $K_i$, and thus, different occurrences may assign different truth values to $\psi_1$∃u$\psi_2$, requiring splitting of each structure into two. The input to the CheckUntil function in line 15 of FIG. 8 is a hierarchical structure K and formulas $\psi_1$ and $\psi_2$. Let K=<$K_1$, . . . $K_n$>, where each $K_i$=<$N_i$, $B_i$, $in_i$, $out_i$, $X_i$, $Y_i$, $E_i$>. The computation proceeds in two phases.

In the first phase, the index set {1, . . . n } is partitioned into three sets, YES, NO, and MAYBE, with the following interpretation. An index i belongs to YES when the entry node $in_i$ satisfies the until-formula $\psi_1$∃u$\psi_2$ within the expanded structure $K_i^F$. Then, in $K^F$, for every occurrence of $K_i^F$, the entry node $in_i$ satisfies $\psi_1$∃u$\psi_2$. Now consider an index i that does not belong to YES. It belongs to MAYBE if within $K_i^F$ there is a (finite) trajectory from $in_i$ to $out_1$ that contains only states labeled with $\psi_1$. In this case, it is possible that for some occurrences of $K_i^F$ in $K^F$, the entry node satisfies $\psi_1$∃u$\psi_2$ depending on whether or not the exit node satisfies $\psi_1$∃u$\psi_2$. In the last case, the index i belongs to NO, and in every occurrence of $K_i^F$, the entry node does not satisfy the formula $\psi_1$∃u$\psi_2$. The desired partitioning is computed by the following procedure.

YES:=∅; NO:=∅; MAYBE:=∅;
For i=n downto 1 do
 If there exists a source-$in_i$ trajectory $w_0$ . . . $w_m$ over $N_i$∪$B_i$ such that
  (i) ($w_j$, $w_{j+1}$) ∈E for 0≦j<m,
  (ii) for0≦j<m, $w_j$∈N with $\psi_1$∈X($w_j$) or $w_j$∈B with Y($w_j$) ∈MAYBE, and
  (iii) $w_m$∈N with $\psi_2$∈X($w_m$) or $w_m$∈B with Y($w_m$)∈YES
 Then add i to YES
 Else If there exists a source-$in_i$ trajectory $w_0$ . . . $w_m$ over $N_i$∪$B_i$ such that (i) $(w_j, w_{j+1}) \in E$ for $0 \leq j < m$, (ii) for $0 \leq j < m$, $w_j \in N$ with $\psi_1 \in X(w_j)$ or $w_j \in B$ with $Y(w_j) \in$ MAYBE, and (iii) $w_m = \text{out}_1$;

Then add i to MAYBE

Else add i to NO.

The computation for each index i can be performed by a depth-first search starting at the node $\text{in}_i$ in time $|K_i|$.

In the second phase, the new hierarchical structure K' along with the labeling with $\psi_1 \exists u \psi_2$ is constructed. Each structure $K_i$ is split into two: $K_i^0$ and $K_i^1$. A box b that is previously mapped to $K_i$, will be mapped to $K_i^1$ if there is a path starting at b that satisfies $\psi_1 \exists u \psi_2$, and otherwise to $K_i^0$. Consequently, nodes within $K_i^1$ can satisfy $\psi_1 \exists u \psi_2$ along a path that exits $K_i$, while nodes within $K_i^0$ can satisfy $\psi_1 \exists u \psi_2$ only if they satisfy it within $K_i$. The new structure $K' = \langle K_1^0, K_1^1, \ldots K_n^0, K_n^1 \rangle$ is obtained by replacing each $K_i$ of K with two structures: $K_i^0 = \langle N_i, B_i, \text{in}_i, \text{out}_i, X_i^0, Y_i^0, E_i \rangle$ and $K_i^1 = \langle N_i, B_i, \text{in}_i, \text{out}_i, X_i^0, Y_i^0, E_i \rangle$ and $K_i^1 = \langle N_i, B_i, \text{in}_i, \text{out}_i, X_i^1, Y_i^1, E_i \rangle$. For states $u, v \in N_i \cup B_i$, v is $\psi_1^*$-successor of u if there exists a finite sequence $w_0 \ldots w_m$ over $N_i \cup B_i$, such that (i) $w_0 = u$, (ii) $w_m = v$, (iii) $(w_k, w_{k+1}) \in E_i$ for $0 \leq k < m$, (iv) if $u \in B_i$ then $\psi_1 \in X)(\text{out}_{Y(u)})$, and (v) for $1 \leq k < m$, $w_k \in N_i$ with $\psi_1 \in X_i(w_k)$ or $w_k \in B_i$ with $Y_i(w_k) \in$ MAYBE. For $u \in N_i \cup B_i$, u has a $\psi_2$-successor, if there exists $v \in N_i$ with $(u,v) \in E_i$ and $\psi_2 \in X(v)$ or $v \in B_i$ with $(u,v) \in E_i$ and $Y(v) \in$ YES.

For the indexing of boxes of $K_i^0$, consider a box b with $Y_i(b) = j$. If b has a $\psi_1^*$-successor u which has a $\psi_2$-successor, then $Y_i^0(b) = 2j$, else $Y_i^0(b) = 2j - 1$.

For the indexing of boxes of $K_i^1$, consider a box b with $Y_i(b) = j$. If b has a $\psi_1^*$-successor u which has a $\psi_2$-successor, or if $\text{out}_i$ is a $\psi_1^*$-successor of b, then $Y_i^1(b) = 2j$, else $Y_i^1(b) = 2j - 1$.

For labeling of a node u of $K_i^0$, if u has a $\psi_1^*$-successor v which has a $\psi_2$-successor, then $X_i^0(u)$ equals $X_i(u)$ with $\psi_1 \exists u \psi_2$ added to it, else it equals $X_i(u)$.

For labeling of a node u of $K_i^1$, if u has a $\psi_1^*$-successor v which has a $\psi_2$-successor, or if $\text{out}_i$ is a $\psi_1^*$-successor of u, then $X_i^1(u)$ equals $X_i(u)$ with $\psi_1 \exists u \psi_2$ added to it, else it equals $X_i(u)$.

The computation required in this phase can be performed in time $O(|K|)$.

Complexity

Processing of each subformula requires time linear in the size of the current structure. Processing of every temporal connective at worst doubles the size of the current structure. This implies that, for the single-exit case, the algorithm of FIGS. 8 and 9 solves the CTL model-checking problem $(K, \phi)$, for a single-exit hierarchical structure K, in time $O(|K| \cdot 2^{|\phi|})$. It is known that deciding whether a flat Kripke structure M satisfies a CTL formula $\phi$ can be solved in space $O(|\phi| \cdot \log|M|)$. For a hierarchical structure K, the size of the expanded structure $K^F$ is $O(|K|^{nd(K)})$. It follows that CTL model checking for hierarchical structures is in Pspace. A Pspace lower bound is now established for the case of single-exit hierarchical structures. That is, for the single-exit case, model checking of CTL formulas for single-exit hierarchical structures is Pspace-complete.

Multiple-Exit Case

Now consider the case when the hierarchical structure K has multiple exits. The model-checking algorithm is similar to the algorithm for the single-exit case, except now more splitting may be required. For instance, consider a structure $K_i$ with 2 exit nodes u and v, and a formula $\psi = \exists \bigcirc p$. For different boxes mapped to $K_i$, whether the exit node u satisfies $\psi$ can vary, and similarly, whether the exit node v satisfies $\psi$ can vary. Consequently, $K_i$ needs to be split into four copies, depending whether both u and v, only u, only v, or neither have a $\psi$-successor outside $K_i$. In general, if there are d exit-nodes, processing of a single temporal subformula can generate $2^d$ copies of each structure in the worst case. The CTL model-checking problem $(K, \phi)$ can be solved in time $O(|K| \cdot 2^{|\phi| \cdot d})$, where each structure of K has at most d exit nodes.

The alternative approach of applying known model-checking procedures to the expanded structure gives a time bound of $O(|\phi| \cdot |K|^{nd(K)})$, or alternatively, a Pspace bound. The lower bound of Pspace applies even for some small fixed CTL formula, and thus, CTL model checking becomes indeed harder with multiple exit nodes. The structure complexity of CTL model checking for hierarchical structures is Pspace-complete.

Conclusions

Verification of hierarchical machines can be done without flattening them first. The present invention is directed to efficient algorithms, and matching lower bounds, for the model-checking problem for all the commonly used specification formalisms. The present invention establishes that hierarchical specifications offer exponential succinctness at a minimal price.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for testing a hierarchical state machine that models flow of control within a real system, comprising the steps of:

(I) providing the hierarchical state machine for the real system; and (II) performing model checking on the hierarchical state machine, wherein the real system is a circuit or a computer program and the model checking is applied to the hierarchical state machine without first flattening the hierarchical state machine, wherein the hierarchical state machine is a finite state machine comprising a plurality of states, wherein at least two of the states are multiple instances of a single state machine and the model checking comprises comparison of the hierarchical state machine against at least one correctness requirement to determine whether the hierarchical state machine satisfies the at least one correctness requirement, wherein, during the model checking, each state machine having multiple instances in the hierarchical state machine is analyzed fewer times than its number of instances in the hierarchical state machine using cyclic temporal logic relation.

2. The method of claim 1, wherein the model checking includes a reachability analysis in which reachability of one or more target states is determined while maintaining:
 a first set of information to keep track of states that have been visited during the reachability analysis; and
 a second set of information to keep track of one or more exit nodes for each state in the hierarchical state machine that is a superstate corresponding to a finite state machine (FSM).

3. The method of claim 2, wherein the reachability analysis is performed by implementing a depth-first-search (DFS) function at the entry node of the hierarchical state machine, wherein the DFS function comprises the following steps applied to a current state:
 (a) returning a positive result if the current state is one of the target states;
 (b) updating the first set of information to identify the current state as having been visited;
 (c) it the current state is a normal state, then, for each state v connected to the current state, if state v has not yet been visited, then implementing the DFS function at state v; and
 (d) it the current state is a superstate, then:
  (1) if the entry node of the FSM corresponding to the current state has not yet been visited, then implementing the DFS function at the entry node and updating the second set of information to keep track of the one or more exit nodes of the FSM; and
  (2) for each state w connected to an exit node of the FSM, if state w has not yet been visited, then implementing the DFS function at state w.

4. The method of claim 1, wherein the model checking includes a cycle-detection analysis in which reachability of one or more target states existing in a closed processing path is determined while maintaining:
 a first set of information to keep track of states that have been visited during a first phase of the cycle-detection analysis in which reachability of at least one of the one or more target states is determined;
 a second set of information to keep track of one or more exit nodes for each state in the hierarchical state machine that is a superstate corresponding to a finite state machine; and
 a third set of information to keep track of states that have been visited during a second phase of the cycle-detection analysis in which it is determined whether a reachable target state is part of a closed processing path.

5. The method of claim 4, wherein the cycle-detection analysis is performed by implementing a primary search function at the entry node of the hierarchical state machine, wherein the primary search function comprises the following steps applied to a current state:
 (a) pushing the current state onto a stack;
 (b) updating the first set of information to identify the current state as having been visited during a primary search;
 (c) if the current state is a normal state, then:
  (1) for each state v connected to the current state, if state v has not yet been visited during, a primary search, then implementing the primary search function at state v; and
  (2) if the current state is a target state and the current state has not yet been visited during a secondary search, then implementing a second search function at the current state;
 (d) if the current state is a superstate, then:
  (1) if the entry node of the FSM corresponding to the current state has not yet been visited during a primary search, then implementing the primary search function at the entry node and updating the second set of information to keep track of the one or more exit nodes of the FSM; and
  (2) for each exit node u of the FSM:
   (i) for each state w connected to exit node u, if state w has not yet been visited during a primary search, then implementing the primary search function at state w;
   (ii) if exit node u was visited during a secondary search, then, for each state w connected to exit node u:
    (a) if state w is in the stack, then returning a positive result; and
    (b) if state w has not yet been visited during a secondary search, then implementing the secondary search function at state w; and
 (e) popping the stack, wherein: the secondary search function comprises the following steps applied to a current state:
 (A) updating the third set of information to identify the current state as having been visited during a secondary search; and
 (B) if the current state is a normal state, then, for each state v connected to the current state:
  (1) if state v is in the stack, then returning a positive result; and
  (2) if state v has not yet been visited during a secondary search, then implementing the secondary search function at state v; and
 (C) if the current state is a superstate, then, for each state w connected to an exit node of the FSM corresponding to the current state:
  (1) if state w is in the stack, then returning a positive result; and
  (2) if state w has not yet been visited during a secondary search, then implementing the secondary search function at state w.

6. The method of claim 4, where an automata-emptiness problem is solved using the primary and secondary search functions.

7. The method of claim 4, where a model checking problem for linear temporal logic is solved using the primary and secondary search functions.

8. The invention method of claim 1, wherein the model checking includes a branching-time requirements analysis in which states in the hierarchical state machine are identified that satisfy one or more temporal logic requirements, wherein, for each temporal logic requirement, multiple versions are generated of the FSM corresponding to each state in the hierarchical state machine that is a superstate to represent different possible temporal logic conditions of the FSM and an appropriate FSM version is selected for the context of each occurrence of the superstate in the hierarchical state machine.

9. The invention method of claim 8, wherein the branching-time requirements analysis comprises the following steps applied to the hierarchical state machine for an original temporal logic formula:
   (a) generating, from the original temporal logic formula, a list of subformulas arranged in order of increasing size;
   (b) for each subformula in the list, implementing a subroutine corresponding to the syntax of the subformula; and
   (c) if the entry node of the hierarchical state machine satisfies the original temporal logic formula, then returning a positive result.

10. The method of claim 9, wherein, for a current subformula,
   (a) if the current subformula has the syntax of an atomic proposition, then stop;
   (b) if the current subformula has the syntax of the logical complement of a formula $\chi$, then, for each ordinary state u in the hierarchical state machine, if $\chi$ is not satisfied at state u, then indicate that the current subformula is satisfied at state u;
   (c) if the current subformula has the syntax of a first formula combined with a second formula by the logical AND operation, then, for each state u in the hierarchical state machine, if the first formula is satisfied at state u and the second formula is satisfied at state u, then indicate that the current subformula is satisfied at state u;
   (d) if the current subformula has the syntax that along some path a next state satisfies a formula $\chi$, then implement a CheckNext subroutine;
   (e) if the current subformula has the syntax that along some path a formula $\chi$ is always satisfied, then implement a CheckAlways subroutine; and
   (f) if the current subformula has the syntax that a first formula is satisfied along some path until a second formula is satisfied, then implement a CheckUntil subroutine, wherein, during the CheckNext, CheckAlways, and CheckUntil subroutines, for the current subformula, multiple versions are generated of the FSM corresponding to each state in the hierarchical state machine that is a superstate to represent different possible subformula conditions and an appropriate version is selected for the context of each occurrence of the superstate in the hierarchical state machine.

11. The method of claim 1, wherein the real system is a computer program.

12. The method of claim 1, wherein, during the model checking, each state machine having multiple instances in the hierarchical state machine is analyzed only once to achieve model checking having linear time complexity.

13. A machine-readable medium having stored thereon a plurality of instructions, the plurality of instructions including instructions that, when executed by a computer, cause the computer to perform a method for testing a hierarchical state machine that models flow of control within a real system, comprising the steps of:
   (I) providing the hierarchical state machine for the real system; and
   (II) performing model checking on the hierarchical state machine, wherein the real system is a circuit or a computer program and the model checking is applied to the hierarchical state machine without first flattening the hierarchical state machine, wherein the hierarchical state machine is a finite state machine comprising a plurality of states, wherein at least two of the states are multiple instances of a single state machine and the model checking comprises comparison of the hierarchical state machine against at least one correctness requirement to determine whether the hierarchical state machine satisfies the at least one correctness requirement, wherein, during the model checking, each state machine having multiple instances in the hierarchical state machine is analyzed fewer times than its number of instances in the hierarchical state machine using cyclic temporal logic relation.

14. The medium of claim 13, wherein the model checking includes a reachability analysis in which reachability of one or more target states is determined while maintaining:
   a first set of information to keep track of states that have been visited during the reachability analysis; and
   a second set of information to keep track of one or more exit nodes for each state in the hierarchical state machine that is a superstate corresponding to a finite state machine (FSM).

15. The medium of claim 14, wherein the reachability analysis is performed by implementing a depth-first-search (DFS) function at the entry node of the hierarchical state machine, wherein the DFS function comprises the following steps applied to a current state:
   (a) returning a positive result if the current state is one of the target states;
   (b) updating the first set of information to identify the current state as having been visited;
   (c) if the current state is a normal state, then, for each state v connected to the current state, if state v has not yet been visited, then implementing the DFS function at state v; and
   (d) if the current state is a superstate, then:
      (1) if the entry node of the FSM corresponding to the current state has not yet been visited, then implementing the DFS function at the entry node and updating the second set of information to keep track of the one or more exit nodes of the FSM; and
      (2) for each state w connected to an exit node of the FSM, if state w has not yet been visited, then implementing the DFS function at state w.

16. The medium of claim 13, wherein the model checking includes a cycle-detection analysis in which reachability of one or more target states existing in a closed processing path is determined while maintaining:
   a first set of information to keep track of states that have been visited during a first phase of the cycle-detection analysis in which reachability of at least one of the one or more target states is determined;
   a second set of information to keep track of one or more exit nodes for each state in the hierarchical state machine that is a superstate corresponding to a finite state machine; and
   a third set of information to keep track of states that have been visited during a second phase of the cycle-detection analysis in which it is determined whether a reachable target state is part of a closed processing path.

17. The medium of claim 16, wherein the cycle-detection analysis is performed by implementing a primary search function at the entry node of the hierarchical state machine, wherein the primary search function comprises the following steps applied to a current state:

(a) pushing the current state onto a stack;

(b) updating the first set of information to identify the current state as having been visited during a primary search;

(c) if the current state is a normal state, then:
  (1) for each state v connected to the current state, if state v has not yet been visited during a primary search, then implementing the primary search function at state v; and
  (2) if the current state is a target state and the current state has not yet been visited during a secondary search, then implementing a second search function at the current state;

(d) if the current state is a superstate, then:
  (1) if the entry node of the FSM corresponding to the current state has not yet been visited during a primary search, then implementing the primary search function at the entry node and updating the second set of information to keep track of the one or more exit nodes of the FSM; and
  (2) for each exit node u of the FSM:
    (i) for each state w connected to exit node u, if state w has not yet been visited during a primary search, then implementing the primary search function at state w;
    (ii) if exit node u was visited during a secondary search, then, for each state w connected lo exit node u:
      (a) if state w is in the stack, then returning a positive result; and
      (b) if state w has not yet been visited during a secondary search, then implementing the secondary search function at state w; and (e) popping the stack, wherein: the secondary search function comprises the following steps applied to a current state:

(A) updating the third set of information to identify the current state as having been visited during a secondary search; and (B) if the current state is a normal state, then, for each state v connected to the current state:
  (1) if state v is in the stack, then returning a positive result; and
  (2) if state v has not yet been visited during a secondary search, then implementing the secondary search function at state v; and (C) if the current state is a superstate, then, for each state w connected to an exit node of the FSM corresponding to the current state:
  (1) if state w is in the stack, then returning a positive result; and
  (2) if state w has not yet been visited during a secondary search, then implementing the secondary search function at state w.

18. The medium of claim 16, where at least one of an automata-emptiness problem and a model checking problem for linear temporal logic is solved using the primary and secondary search functions.

19. The medium of claim 13, wherein the model checking includes a branching-time requirements analysis in which states in the hierarchical state machine are identified that satisfy one or more temporal logic requirements, wherein, for each temporal logic requirement, multiple versions are generated of the FSM corresponding to each state in the hierarchical state machine that is a superstate to represent different possible temporal logic conditions of the FSM and an appropriate FSM version is selected for the context of each occurrence of the superstate in the hierarchical state machine.

20. The invention medium of claim 19, wherein the branching-time requirements analysis comprises the following steps applied to the hierarchical state machine for an original temporal logic formula:

(a) generating, from the original temporal logic formula, a list of subformulas arranged in order of increasing size;

(b) for each subformula in the list, implementing a subroutine corresponding to the syntax of the subformula; and (c) if the entry node of the hierarchical state machine satisfies the original temporal logic formula, then returning a positive result.

21. The medium of claim 20, wherein, for a current subformula, (a) if the current subformula has the syntax of an atomic proposition, then stop;

(b) if the current subformula has the syntax of the logical complement of a formula $\chi$, then, for each ordinary state u in the hierarchical state machine, if $\chi$ is not satisfied at state u, then indicate that the current subformula is satisfied at state u;

(c) if the current subformula has the syntax of a first formula combined with a second formula by the logical AND operation, then, for each state u in the hierarchical state machine, if the first formula is satisfied at state u and the second formula is satisfied at state u, then indicate that the current subformula is satisfied at state u;

(d) if the current subformula has the syntax that along some path a next state satisfies a formula $\chi$, then implement a CheckNext subroutine;

(e) if the current subformula has the syntax that along some path a formula $\chi$ is always satisfied, then implement a CheckAlways subroutine, and (f) if the current subformula has the syntax that a first formula is satisfied along some path until a second formula is satisfied, then implement a CheckUntil subroutine, wherein, during the CheckNext, CheckAlways and CheckUntil subroutines, for the current subformula, multiple versions are generated of the FSM corresponding to each state in the hierarchical state machine that is a superstate to represent different possible subformula conditions and an appropriate version is selected for the context of each occurrence of the superstate in the hierarchical state machine.

22. The medium of claim 13, wherein the real system is a computer program.

23. The method of claim 13, wherein, during the model checking, each state machine having multiple instances in the hierarchical state machine is analyzed only once to achieve model checking having linear time complexity.

24. A computer-implemented method for testing a hierarchical state machine that models flow of control within a real system, wherein the real system is a circuit or a computer program and model checking is applied to the hierarchical state machine without first flattening the hierarchical state machine, wherein the hierarchical state machine is a finite state machine comprising a plurality of states, wherein at least two of the states are multiple instances of a single state machine and the model checking comprises comparison of the hierarchical state machine against at least one correctness requirement to determine whether the hierarchical state machine satisfies the at least one correctness requirement, wherein, during the model checking, each state machine having multiple instances in the hierarchical state machine is analyzed fewer times than its number of instances in the hierarchical state machine using cyclic temporal logic relation.

25. The method of claim 24, wherein, during the model checking, each state machine having multiple instances in the hierarchical state machine is analyzed only once to achieve model checking having linear time complexity.

* * * * *

UNITED STATES PATENT AND TRADEMARK OFFICE
CERTIFICATE OF CORRECTION

PATENT NO. : 6,324,496 B1
DATED : November 27, 2001
INVENTOR(S) : Rajeev Alur and Mihalis Yannakakis It is certified that error appears in the above-identified patent and that said Letters Patent is hereby corrected as shown below:

Column 15,
Line 9, delete "using cyclic temporal logic relation".

Column 18,
Line 12, delete "using cyclic temporal logic relation".

Column 19,
Line 27, replace "lo" with -- to --.

Column 20,
Line 4, delete "invention".

Column 21,
Line 6, delete "using cyclic temporal logic relation".

Signed and Sealed this

Nineteenth Day of March, 2002

Attest:

JAMES E. ROGAN
*Director of the United States Patent and Trademark Office*

*Attesting Officer*